US010333825B2

(12) United States Patent
Eastlake, III (10) Patent No.: US 10,333,825 B2
(45) Date of Patent: *Jun. 25, 2019

(54) LINK COST DETERMINATION FOR NETWORK LINKS (71) Applicant: Futurewei Technologies, Inc., Plano, TX (US)

(72) Inventor: Donald E. Eastlake, III, Milford, MA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/009,643

(22) Filed: Jun. 15, 2018

(65) Prior Publication Data
US 2018/0295051 A1    Oct. 11, 2018

Related U.S. Application Data (63) Continuation of application No. 15/633,161, filed on Jun. 26, 2017, now Pat. No. 10,003,523, which is a
(Continued)

(51) Int. Cl.
*H04W 4/21* (2018.01)
*H04L 12/26* (2006.01)
(Continued)

(52) U.S. Cl.
CPC .......... *H04L 45/123* (2013.01); *H04L 43/022* (2013.01); *H04L 43/04* (2013.01);
(Continued)

(58) Field of Classification Search
CPC ..... H04L 45/123; H04L 43/022; H04W 40/02
See application file for complete search history.

(56) References Cited

U.S. PATENT DOCUMENTS 9,699,041 B2    7/2017  Eastlake, III et al.
10,003,523 B2 *  6/2018  Eastlake, III ........... H04L 43/04
(Continued)

OTHER PUBLICATIONS

IEEE P802.11ak™/D0.01, Draft Standard Telecommunications and information exchange between systems—Local and metropolitan area networks, Part 11: Wireless LAN Medium Access Control (MAC) and Physical Layer (PHY) Specifications, Amendment tbd>: Enhancements for Transit Links Within Bridged Networks. Sponsor LAN/MAN Standards Committee of the IEEE Computer Society, Mar. 2014, 51 pages.
(Continued)

*Primary Examiner* — Mohammad S Anwar
(74) *Attorney, Agent, or Firm* — James Anderson Harrison (57) ABSTRACT

A link cost determining method including computing, by a station, a new composite data rate using a set of data rates including an average data rate, a geometric mean data rate, and a minimum data rate for data samples, computing, by the station, a pair of hysteresis thresholds for a previous composite data rate, determining, by the station, whether the new composite data rate exceeds one of the pair of hysteresis thresholds, and advertising, by the station, the new composite data rate when the new composite data rate exceeds one of the pair of hysteresis thresholds.

22 Claims, 3 Drawing Sheets

Related U.S. Application Data continuation-in-part of application No. 14/930,839, filed on Nov. 3, 2015, now Pat. No. 9,699,041.

(60) Provisional application No. 62/074,491, filed on Nov. 3, 2014.

(51) Int. Cl.
*H04W 40/02* (2009.01)
*H04L 12/721* (2013.01)

(52) U.S. Cl.
CPC .......... *H04L 43/0894* (2013.01); *H04L 43/16* (2013.01); *H04W 4/21* (2018.02); *H04W 40/02* (2013.01)

(56) References Cited

U.S. PATENT DOCUMENTS

| | | |
|---|---|---|
| 2002/0031126 A1 | 3/2002 | Crichton et al. |
| 2013/0128757 A1 | 5/2013 | Chowdhary et al. |
| 2014/0204823 A1 | 7/2014 | Merlin et al. |

OTHER PUBLICATIONS

IEEE P802.11ak™/D1.0, Draft Standard Telecommunications and information exchange between systems—Local and metropolitan area networks, Part 11: Wireless LAN Medium Access Control (MAC) and Physical Layer (PHY) Specifications Amendment 4: Enhancements for Transit Links Within Bridged Networks. Sponsor LAN/MAN Standards Committee of the IEEE Computer Society, Apr. 2015, 93 pages.

IEEE P802.11ak™/D1.1, Draft Standard Telecommunications and information exchange between systems—Local and metropolitan area networks, Part 11: Wireless LAN Medium Access Control (MAC) and Physical Layer (PHY) Specifications Amendment 4: Enhancements for Transit Links Within Bridged Networks, Sponsor LAN/MAN Standards Committee of the IEEE Computer Society. Jul. 2015, 93 pages.

IEEE Standard for Information technology—Telecommunications and information exchange between systems Local and metropolitan area networks—Specific requirements Part 11: Wireless LAN Medium Access Control (MAC) and Physical Layer (PHY) Specifications. IEEE Computer Society Sponsored by the LAN/MAN Standards Committee, IEEE Std 802.11™—2012, Mar. 29, 2012, 2793 pages.

\* cited by examiner

LINK COST DETERMINATION FOR NETWORK LINKS

CROSS-REFERENCE TO RELATED APPLICATIONS

This application is a continuation of U.S. patent application Ser. No. 15/633,161, filed on Jun. 26, 2017, which is a continuation of U.S. patent application Ser. No. 14/930,839, filed on Nov. 3, 2015, which claims benefit of U.S. Provisional Patent Application No. 62/074,491 filed on Nov. 3, 2014 by Donald E. Eastlake III, and entitled, "Link Cost Determination For Network Links," all of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer network connections over radio, rather than over metal wires or fiber optics, are becoming increasingly common. Institute of Electrical and Electronics Engineers (IEEE) 802.11 wireless fidelity (Wi-Fi), 802.15 Bluetooth®, and cellular phone connections are operating at ever higher data rates with stronger security and better quality of service control. Many of these systems were originally designed for use at the edge of the network but there is increasing demand that they be used for links in the middle of general networks with unrestricted topology. For example, IEEE 802.11ak is extending 802.11 Wi-Fi so that 802.11 connections can be used as transit links in the middle of a network. Such use requires protocols to assure that traffic does not loop and that traffic is routed along a reasonable path to its destination. Examples of such protocols include various versions of spanning trees, distance vectors, or link state protocols, such as, Routing Information Protocol (RIP), Intermediate System to Intermediate System (IS-IS), or Open Shortest Path First (OSPF).

Typically, loop prevention and routing protocols require the assignment of a "cost" to links. The cost is usually considered proportional to the reciprocal of the data rate. However, the bandwidth of wireless links is unreliable and variable compared with wired/fiber links and it typically causes transient disruption to propagate changes in link cost throughout a routing/bridging domain. Further, different networks with different uses or traffic types may require different link cost determination parameters.

SUMMARY

In one embodiment, the disclosure includes a link cost determining method including computing, by a station, a new composite data rate using a set of data rates comprising an average data rate, a geometric mean data rate, and a minimum data rate for data samples, computing, by the station, a pair of hysteresis thresholds for a previous composite data rate, determining, by the station, whether the new composite data rate exceeds one of the pair of hysteresis thresholds, and advertising, by the station, the new composite data rate when the new composite data rate exceeds one of the pair of hysteresis thresholds.

In an embodiment, computing the new composite data rate comprises using a first weight factor for the average data rate, a second weight factor for the geometric mean data rate, and a third weight factor for the minimum data rate. In an embodiment, the method further comprises calculating, by the station, a link cost that corresponds with the new composite data rate. In an embodiment, the method further comprises setting, by the station, the previous composite data rate to the new composite data rate when the new composite data rate does not exceed one of the pair of hysteresis thresholds. In an embodiment, the pair of hysteresis thresholds comprises a first hysteresis threshold and a second hysteresis threshold, wherein the first hysteresis threshold is $$(1 \times H) \times \text{previous composite data rate}$$

where H is a hysteresis parameter, and wherein the second hysteresis threshold is $$\left(\frac{1}{H}\right) \times \text{previous composite data rate.}$$

In an embodiment, the first hysteresis threshold uses a first hysteresis parameter and the second hysteresis threshold uses a second hysteresis parameter, and wherein the first hysteresis parameter and the second hysteresis parameter are different. In an embodiment, the hysteresis parameter is a value greater than zero and less than or equal to one.

In another embodiment, the disclosure includes a link cost determining method including obtaining, by a station, a set of data rate samples within a sampling window, calculating, by the station, a set of data rate samples comprising an average data rate, a geometric mean data rate, and a minimum data rate for the set of data samples, calculating, by the station, a new composite data rate using the set of data rate samples comprising the average data rate, the geometric mean data rate, and the minimum data rate, determining, by the station, whether the new composite data rate exceeds a hysteresis threshold for a previous composite data rate, and advertising, by the station, the new composite data rate when the new composite data rate exceeds the hysteresis threshold for the previous composite data rate.

In an embodiment, calculating the new composite data rate comprises using a first weight factor for the average data rate, a second weight factor for the geometric mean data rate, and a third weight factor for the minimum data rate. In an embodiment, the method further comprises calculating, by the station, a link cost that corresponds with the new composite data rate. In an embodiment, the method further comprises setting, by the station, the previous composite data rate to the new composite data rate when the new composite data rate does not exceed the hysteresis threshold. In an embodiment, the hysteresis threshold is $$(1 \times H) \times \text{previous composite data rate}$$

where H is a hysteresis parameter, and wherein the hysteresis parameter is a value greater than zero and less than or equal to one. In an embodiment, the hysteresis threshold is $$\left(\frac{1}{H}\right) \times \text{previous composite data rate}$$

where H is a hysteresis parameter, and wherein the hysteresis parameter is a value greater than zero and less than or equal to one.

In yet another embodiment, the disclosure includes an apparatus including a transmitter configured to transmit a new composite data rate when the new composite data rate exceeds one of a pair of hysteresis thresholds for a previous composite data rate, a memory, and a processor operably coupled to the transmitter and the memory, and configured to compute the new composite data rate using a set of data rates comprising an average data rate, a geometric mean data rate, and a minimum data rate for a set of data samples, compute the pair of hysteresis thresholds, and determine whether the new composite data rate exceeds one of the pair of hysteresis thresholds. In an embodiment, computing the new composite data rate comprises using a first weight factor for the average data rate, a second weight factor for the geometric mean data rate, and a third weight factor for the minimum data rate. In an embodiment, the processor is configured to calculate a link cost that corresponds with the new composite data rate. In an embodiment, the processor is configured to set the previous composite data rate to the new composite data rate when the new composite data rate does not exceed one of the pair of hysteresis thresholds. In an embodiment, the pair of hysteresis thresholds comprises a first hysteresis threshold and a second hysteresis threshold, wherein the first hysteresis threshold is $$(1 \times H) \times \text{previous composite data rate}$$

where H is a hysteresis parameter, and wherein the second hysteresis threshold is $$\left(\frac{1}{H}\right) \times \text{previous composite data rate.}$$

In an embodiment, the first hysteresis threshold uses a first hysteresis parameter and the second hysteresis threshold uses a second hysteresis parameter, and wherein the first hysteresis parameter and the second hysteresis parameter are different. In an embodiment, the hysteresis parameter is a value greater than zero and less than or equal to one.

For the avoidance of doubt, it should be noted that any one of the embodiments disclosed herein may be combined with any one or more of the other embodiments disclosed herein to create a new embodiment within the scope of the disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments, for calculating link costs using a composite data rate that is parameterized for adjustments for a particular network, traffic type, or usage requirement. Link costs and data rates may be calculated without using an exponentially decaying weighted moving average. A network device calculates link costs and generates the composite data rate using a sequence of fixed length sampling time windows. The data rate for each sample window is the actual achieved data rate when data transfers occur, the attempted data rate when no data transfer occurs, or zero when data transfer fails. The length and number of windows is parameterized and can be varied for a particular network, traffic type, or usage requirement. The cost is determined by a parameterized weighted average of different functions across these sampling windows that may include, but are not limited to, an average data rate, a geometric mean data rate, a minimum data rate, a maximum data rate, and a harmonic mean or median. Groups of these data rates may be referred to as a set of data rates. Further, the network device may advertise the composite data rate when the composite data rate exceeds a hysteresis threshold associated with the previous composite data rate. Using the hysteresis threshold allows the network device to efficiently advertise link costs while ignoring relatively small fluctuations in the data rate.

Figure 1:
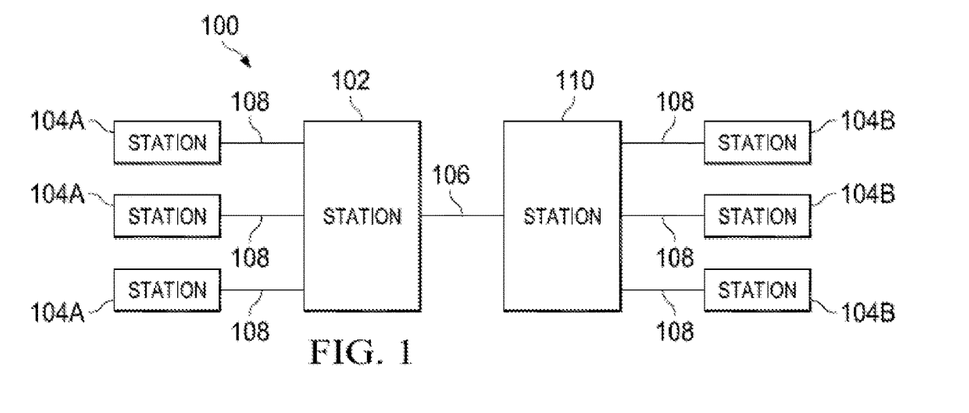
FIG. 1 is a schematic diagram of an embodiment of a network for communicating wireless data traffic.

FIG. 1 is a schematic diagram of a network 100 for communicating wireless data traffic. Network 100 comprises station 102 and neighboring stations 110, 104A, and 104B. In an embodiment, station 102 may be an access point or any other device that transports or assists with transporting data through a network, system, and/or domain (e.g., a modem, a switch, router, bridge, server, client, controller, etc.). In such an embodiment, station 102 is configured to provide access for communicating data traffic and distributing services for stations 110, 104A, and 104B. In an embodiment, any of the neighboring stations 110, 104A, and 104B may also be an access point or any other device that transports or assists with transporting data through a network, system, and/or domain (e.g., a modem, a switch, router, bridge, server, client, controller, etc.). Station 102 is in data communication with station 110 using a wireless link or connection 106. For example, station 102 is in data communication with station 110 using an IEEE 802.11ak link. Additional details about an IEEE 802.11ak link are described in IEEE standard draft titled, "Part 11: Wireless LAN Medium Access Control (MAC) and Physical Layer (PHY) Specifications—Amendment 4: Enhancements For Transit Links Within Bridged Networks," published in July 2015, which is hereby incorporated by reference as if reproduced in its entirety. Alternatively, station 102 may be in data communication with station 110 using any other suitable type of connection or link as would be appreciated by one of ordinary skill in the art upon viewing this disclosure. Station 102 is also coupled to and in signal communication with stations 104A using wired or wireless links 108. Station 110 is coupled to and in signal communication with stations 104B using wired or wireless links 108. Stations 110, 104A, and 104B are addressable network devices. Additional details about station 102 and stations 110, 104A, and 104B are described in IEEE standard draft titled, "Part 11: Wireless LAN Medium Access Control (MAC) and Physical Layer (PHY) Specifications," published in March 2012, which is hereby incorporated by reference as if reproduced in its entirety.

Figure 2:
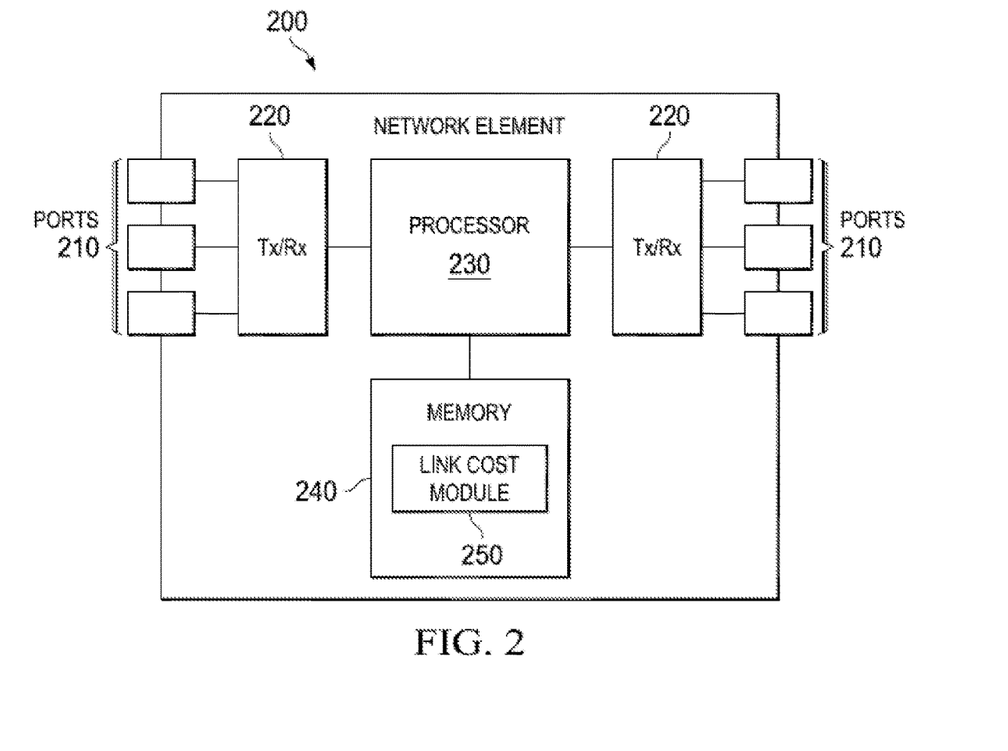
FIG. 2 is a schematic diagram of an embodiment of a network element.

FIG. 2 is a schematic diagram of an embodiment of a network element 200. The network element 200 may be suitable for implementing the disclosed embodiments. Network element 200 may be any device (e.g., a station, an access point, a modem, a switch, router, bridge, server, client, controller, etc.) that transports or assists with transporting data through a network, system, and/or domain. For example, network element 200 may be implemented in stations 110, 104A, and 104B and station 102 in FIG. 1. Network element 200 comprises ports 210, transceiver units (Tx/Rx) 220, a processor 230, and a memory 240 comprising a general link module 250. Ports 210 are coupled to Tx/Rx 220, which may be transmitters, receivers, or combinations thereof. The Tx/Rx 220 may transmit and receive data via the ports 210. Processor 230 is operably coupled to memory 240 and Tx/Rx 220 and is configured to process data. Memory 240 is operably coupled to processor 203 and is configured to store data and instructions for implementing embodiments described herein. The network element 200 may also comprise electrical-to-optical (EO) components and optical-to-electrical (OE) components coupled to the ports 210 and Tx/Rx 220 for receiving and transmitting electrical signals and optical signals.

The processor 230 may be implemented by hardware and software. The processor 230 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 230 is in communication with the ports 210, Tx/Rx 220, and memory 240.

The memory 240 comprises one or more of disks, tape drives, or solid-state drives and may be used as an over-flow data storage device, to store programs when such programs are selected for execution, and to store instructions and data that are read during program execution. The memory 240 may be volatile and non-volatile and may be read-only memory (ROM), random-access memory (RAM), ternary content-addressable memory (TCAM), and static random-access memory (SRAM). Link cost module 250 is implemented by processor 230 to execute the instructions for calculating link costs using a composite data rate and advertising the composite data rate when the composite data rate exceeds a hysteresis threshold associated with the previous composite data rate. The inclusion of link cost module 250 provides an improvement to the functionality of network element 200. Link cost module 250 also effects a transformation of network element 200 to a different state. Alternatively, link cost module 250 is implemented as instructions stored in the processor 230.

Figure 3:
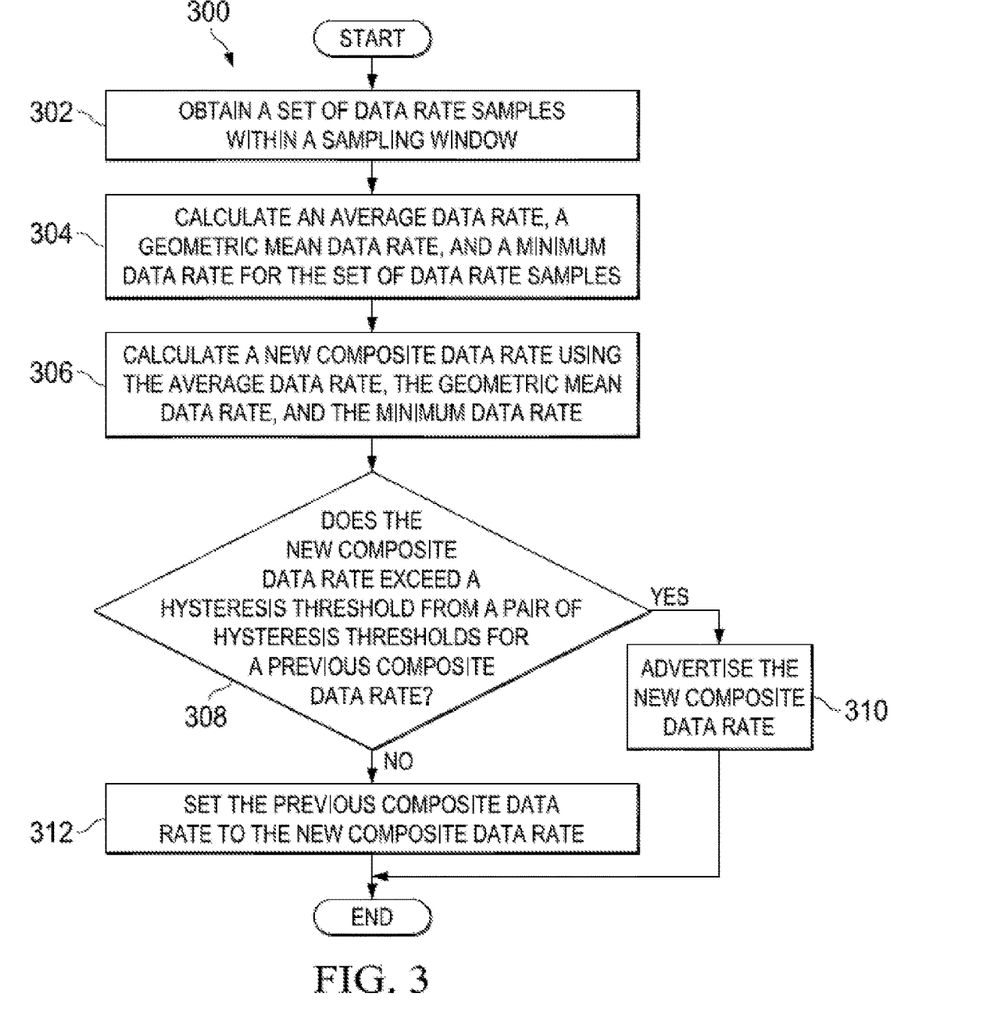
FIG. 3 is a flowchart of an embodiment of a link cost determination method.

FIG. 3 is a flowchart of an embodiment of a link cost determination method 300. Method 300 is implemented by a station (e.g., station 102 in FIG. 1 or network element 200 in FIG. 2) to calculate link costs using a composite data rate and advertise the composite data rate when the composite data rate exceeds a hysteresis threshold associated with the previous composite data rate.

At step 302, the station obtains a set of data rate samples within a sampling window. For each link an array of $S_{num}$ data rate samples, $S^0, S^1, \ldots, S^{Snum}$, is created. Each data rate sample represents a time window of $S_{time}$, for example, in milliseconds. For example, the sampling window may be continuous and the rate of transfer during the window may be measured in units of 100 kilobits per second (kb/s). Alternatively, the sampling window may use any other suitable units as would be appreciated by one of ordinary skill in the art upon viewing this disclosure. At start up, when there is no history, the array of $S_{num}$ data rate samples may be initially populated with $S_{initial}$ data bits/second for each sample which may be the minimum data rate the link is configured to operate at. During operation, at about every $S_{time}$ unit of time the data rate samples are shifted to set each $S^{N+1}$ to $S^N$, discarding the old value of $S^{Snum}$, and set $S^0$ to the actual average successful data transfer rate over the most recent time window when data was successfully transferred, the data transfer rate that would be attempted when there is no attempt at transferring data in that window, or to zero if all attempted data transfer failed during that window.

At step 304, the station calculates an average data rate, a geometric mean data rate, and a minimum data rate for the data rate samples. As an example, the average data rate $R_{avg}$ may be determined as:

$$R_{avg} = \frac{\sum S^N}{S_{size}}, \qquad (1)$$

where $S^N$ indicates a data sample rate at sample location N in the data sample array and $S_{size}$ indicates the number of data rate samples in the data rate sample array or sampling window. Alternatively, the average data rate $R_{avg}$ may be determined as:

$$R_{avg} = \text{Floor}\left(\sum_{i=0}^{i=N+1} \frac{R[i]}{N+2}\right), \qquad (2)$$

where Floor( ) is a floor (or "largest integer not greater than") function, N is the number of data rate samples in the data rate sample array or sampling window, and R[i] indicates the data sample rate at sample location i in the data sample array. The geometric mean data rate $R_{geo}$ may be determined as:

$$R_{geo} = \sqrt[S_{size}]{\prod S^N}, \qquad (3)$$

where $S^N$ indicates a data sample rate at sample location N in the data sample array and $S_{size}$ indicates the number of data rate samples in the data rate sample array or sampling window. Alternatively, the geometric mean data rate $R_{geo}$ may be determined as:

$$R_{geo} = \text{Floor}\left(\sqrt[N+2]{\prod_{i=0}^{i=N+1} (R[i] + C)}\right), \qquad (4)$$

where Floor( ) is a floor function, N is the number of data rate samples in the data rate sample array or sampling window, R[i] indicates the data sample rate at sample location i in the data sample array, and C is a constant factor, for example 1. The minimum data rate $R_{min}$ is set to the smallest value in the data rate sample array. Alternatively, any other suitable function may be applied to determine the average data rate, the geometric mean data rate, and/or the minimum data rate as would be appreciated by one of ordinary skill art upon viewing this disclosure.

At step 306, the station calculates a new composite data rate using the average data rate, the geometric mean data rate, and the minimum data rate. As an example, the new composite data rate $R_{com}$ may be determined as:

$$R_{com} = \frac{W_{avg} \times R_{avg} + W_{geo} \times R_{geo} + W_{min} \times R_{min}}{3}, \quad (5)$$

where $R_{avg}$ is the average data rate, $W_{avg}$ is a weight factor associated with the average data rate $R_{avg}$, $R_{geo}$ is the geometric mean data rate, $W_{geo}$ is a weight factor associated with the geometric mean data rate $R_{geo}$, $R_{min}$ is the minimum data rate, and $W_{min}$ is a weight factor associated with the minimum data rate $R_{min}$. Alternatively, the new composite data rate $R_{com}$ may be determined as:

$$R_{com} = \text{Floor}\left(\frac{W_{avg} \times R_{avg} + W_{geo} \times R_{geo} + W_{min} \times R_{min}}{C + W_{avg} + W_{geo} + W_{min}}\right), \quad (6)$$

where Floor( ) is a floor function and C is a constant factor, for example 1. The weight factors may be individually adjusted to provide more weight or influence to the average data rate, the geometric mean data rate, the minimum data rate, respectively. The denominator in equations (5) and (6) may be referred to as a normalization factor and may be set to a value greater than the sum of the weight factors $W_{avg}$, $W_{geo}$, and $W_{min}$. Additional details about calculating the average data rate, the geometric mean data rate, the minimum data rate, and the composite data rate are described in IEEE standard draft titled, "Part 11: Wireless LAN Medium Access Control (MAC) and Physical Layer (PHY) Specifications—Amendment 4: Enhancements For Transit Links Within Bridged Networks," published in April 2015.

At step 308, the station determines whether the new composite data rate exceeds a hysteresis threshold from a pair of hysteresis thresholds for a previous composite data rate. For each sampling window, the station compares the new composite data rate with the previous composite data rate using a hysteresis parameter H. The hysteresis parameter H may be any value that is greater than zero and less than or equal to one. For example, the hysteresis parameter may be equal to 0.20, 0.25, or any other suitable value as would be appreciated by one of ordinary skill in the art upon viewing this disclosure. A first hysteresis threshold is calculated as:

$$(1 \times H) \times \text{previous composite data rate}, \quad (7)$$

and a second hysteresis threshold is calculated as:

$$\left(\frac{1}{H}\right) \times \text{previous composite data rate}. \quad (8)$$

The new composite data rate exceeds the hysteresis threshold for a previous composite data rate when the new composite data rate is less than the first hysteresis threshold or is greater than the second hysteresis threshold. In an embodiment, different hysteresis parameters can be used, for example, a first hysteresis parameter may be used to determine the first hysteresis threshold and a second hysteresis parameter may be used to determine the second hysteresis threshold. Optionally, the new composite data rate may then be rounded down to the next lower standard data rate for the type of link (e.g., the next lowest standard 802.11 data rate). The station proceeds to step 310 when the new composite data rate exceeds a hysteresis threshold for the previous composite data rate. Otherwise, the station proceeds to step 312 when the new composite data rate does not exceed a hysteresis threshold for a previous composite data rate.

At step 310, the station advertises the new composite data rate to one or more network devices in a network. For example, the station may advertise the new composite data rate to other stations in a network. In an embodiment, the station calculates a link cost that corresponds with the new composite data rate and advertises the link cost. The station may calculate the link cost that corresponds with the new composite data rate using any suitable technique as would be appreciated by one of ordinary skill in the art upon viewing this disclosure. Returning to step 308, the station proceeds to step 312 when the new composite data rate does not exceed a hysteresis threshold for a previous composite data rate. At step 312, the station sets the previous composite data rate to the new composite data rate.

As an example, for 802.11ak, $S_{time}$ may be in milliseconds and $S_{size}$ is configurable over the range of 2 to 256 which may be encoded into an 8-bit unsigned integer. $S_{initial}$ data rate is set to an IEEE 802.11 data rate such as, for example, six million bits per second (bps). $S_{num}$ may be configurable over the range of 2 to 257 to be similarly encodable. Default values may be set for $S_{time}$ and $S_{num}$. For example, a default value for $S_{time}$ may be 16 milliseconds and a default value for $S_{num}$ may be 16 samples. Weight factors $W_{avg}$, $W_{geo}$, and $W_{min}$ may be encoded as 8-bit integers. Further, the weight factors $W_{avg}$, $W_{geo}$, and $W_{min}$ may be fractions of 256, for example, $0/256$ to $255/256$. The link cost may be an equally weighted combination of the average data rate, geometric mean data rate, and minimum data rate, with weights of about 0.6 and a normalization factor of about 3 for the composite data rate such that $$R_{com} = \frac{0.6 \times R_{avg} + 0.6 \times R_{geo} + 0.6 \times R_{min}}{3}. \quad (9)$$

In an embodiment, the hysteresis parameter H may be encoded as an 8-bit integer that is incremented and divided by 257. For example, hysteresis parameter H may be a value from $1/257$ to $256/257$. As an example, the hysteresis parameter H may be about 0.8 so that a 20% or more decrease or a 25% or more increase is reported, which may cause a transient routing disruption in the domain, while smaller changes are ignored.

Figure 4:
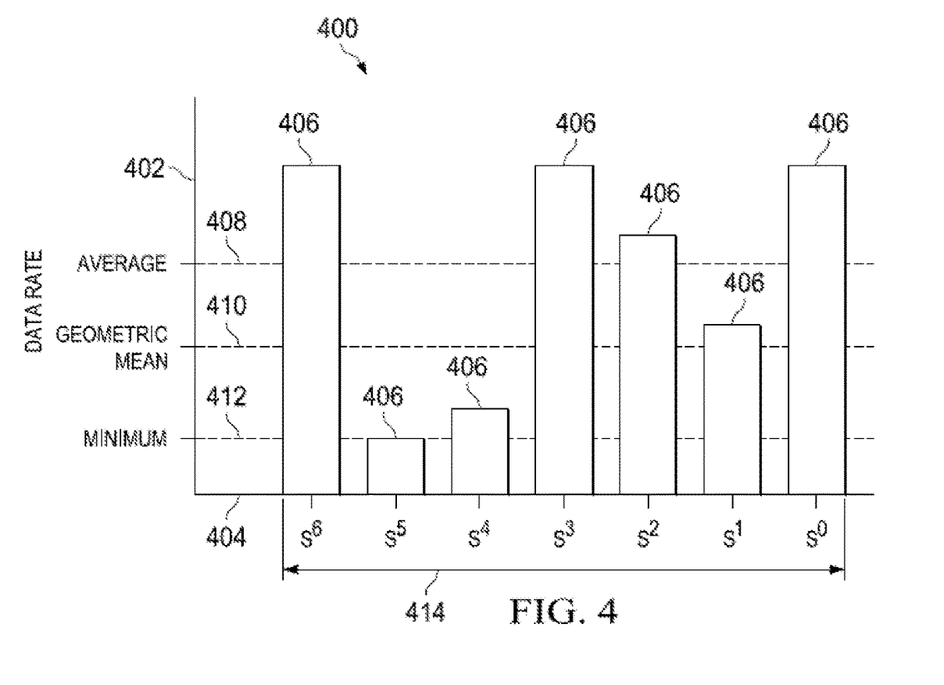
FIG. 4 is a graph of an embodiment of a set of data rate samples in a sampling window.

FIG. 4 is a graph 400 of an embodiment of a set of data rate samples 406 in a sampling window 414. Graph 400 illustrates the result of various functions that may be applied to the set of data rate samples 406. Axis 402 indicates data rates and axis 404 indicates relative time. The set of data rate samples 406 may be obtained by a station (e.g., station 102 in FIG. 1) using a process similar to step 302 in FIG. 3.

Further, the set of data rate samples 406 may be processed by the station using a process similar to step 304 in FIG. 3. An averaging function is applied to the set of data rate samples 406 to calculate an average data rate 408. Similarly, a geometric mean function is applied to the set of data rate samples 406 to calculate a geometric mean data rate 410. The minimum data rate 412 is equal to the lowest data rate from the set of data rate samples 406 in the sampling window 414.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A link data rate determining method performed by a station coupled to communicate with another station via transceiver circuitry, comprising:
   obtaining a first array of sample data rates for a first sequence of sample time windows;
   computing a first data rate according to an average data rate, a geometric mean data rate, and a minimum data rate of the first array of sample data rates;
   computing a second data rate according to an average data rate, a geometric mean data rate, and a minimum data rate of a second array of sample data rates for a second sequence of sample time windows; and
   transmitting via the transceiver circuitry the second data rate based on a comparison between the second data rate and the first data rate using a hysteresis parameter.

2. The method of claim 1, wherein the second data rate is computed using a first weight, a second weight, and a third weight respectively for the average data rate, the geometric mean data rate and the minimum data rate of the second array of sample data rates.

3. The method of claim 1, further comprising calculating a link cost that corresponds with the second data rate.

4. The method of claim 1, wherein the comparison is based on a first hysteresis threshold and a second hysteresis threshold, and wherein the first hysteresis threshold is proportionally related to the hysteresis parameter and the second hysteresis threshold is inversely related to the hysteresis parameter.

5. The method of claim 1, wherein the comparison is based on a first hysteresis threshold and a second hysteresis threshold, wherein the first hysteresis threshold is associated with the hysteresis parameter and the second hysteresis threshold is associated with a separate hysteresis parameter different from the hysteresis parameter.

6. The method of claim 1, wherein the hysteresis parameter is a value greater than zero and less than or equal to one.

7. The method of claim 1, wherein the second sequence of sample time windows do not include an earliest sample time window of the first sequence of sample time windows, and the first sequence of sample time windows do not include a latest sample time window of the second sequence of sample time windows.

8. The method of claim 1, wherein values of an ordered sequence $S^0, S^1, \ldots, S^{Snum}$ are set to represent the first array of sample data rates and wherein the values of the ordered sequence are shifted along the ordered sequence to represent the second array of sample data rates, and wherein a value of $S^{Snum}$ for the first array of sample data rates is discarded for representing the second array of the sample data rates.

9. The method of claim 1, wherein each sample data rate is measured in units of 100 kilobits per second (kb/s).

10. The method of claim 1, wherein the average data rate of the first array of sample data rates is determined as:

$$R_{avg} = \text{Floor}\left(\sum_{i=0}^{i=N+1} \frac{R[i]}{N+2}\right)$$

where $R_{avg}$ is the average data rate of the first array of sample data rates, Floor( ) is a floor function, N is a number of sample data rates in the first array, and R[i] indicates a sample data rate at sample location i in the first array.

11. The method of claim 1, wherein the geometric mean data rate of the first array of sample data rates is determined as:

$$R_{geo} = \text{Floor}\left(\sqrt[N+2]{\prod_{i=0}^{i=N+1}(R[i]+1)}\right)$$

where $R_{geo}$ is the geometric mean data rate of the first array of sample data rates, Floor( ) is a floor function, N is a number of sample data rates in the first array, and R[i] indicates a sample data rate at sample location i in the first array.

12. The method of claim 1, wherein the geometric mean data rate of the first array of sample data rates is determined as:

$$R_{geo} = \text{Floor}\left(\sqrt[N+2]{\prod_{i=0}^{i=N+1}(R[i]+1)}\right)$$

where $R_{geo}$ is the geometric mean data rate of the first array of sample data rates, Floor( ) is a floor function, N is a number of sample data rates in the first array, and R[i] indicates a sample data rate at sample location i in the first array.

13. An apparatus, comprising:
   a transmitter configured to transmit a composite data rate;
   a memory storing instructions; and
   a processor coupled to the transmitter and the memory to execute the instructions, the processor configured to:
   obtain a first array of sample data rates for a first sequence of sample time windows;

compute a first data rate according to an average data rate, a geometric mean data rate, and a minimum data rate of the first array of sample data rates;

compute a second data rate according to an average data rate, a geometric mean data rate, and a minimum data rate of a second array of sample data rates for a second sequence of sample time windows; and transmit the second data rate based on a comparison between the second data rate and the first data rate using a hysteresis parameter.

14. The apparatus of claim 13, wherein the second data rate is computed using a first weight, a second weight, and a third weight respectively for the average data rate, the geometric mean data rate and the minimum data rate of the second array of sample data rates.

15. The apparatus of claim 13, the processor further configured to calculate a link cost that corresponds with the second data rate.

16. The apparatus of claim 13, wherein the comparison is based on a first hysteresis threshold and a second hysteresis threshold, and wherein the first hysteresis threshold is proportionally related to the hysteresis parameter and the second hysteresis threshold is inversely related to the hysteresis parameter.

17. The apparatus of claim 13, wherein the comparison is based on a first hysteresis threshold and a second hysteresis threshold, wherein the first hysteresis threshold is associated with the hysteresis parameter and the second hysteresis threshold is associated with a separate hysteresis parameter different from the hysteresis parameter.

18. The apparatus of claim 13, wherein the hysteresis parameter is a value greater than zero and less than or equal to one.

19. The apparatus of claim 13, wherein the second sequence of sample time windows do not include an earliest sample time window of the first sequence of sample time windows, and the first sequence of sample time windows do not include a latest sample time window of the second sequence of sample time windows.

20. The apparatus of claim 13, wherein values of an ordered sequence $S^0, S^1, \ldots, S^{Snum}$ are set to represent the first array of sample data rates and wherein the values of the ordered sequence are shifted along the ordered sequence to represent the second array of sample data rates, and wherein a value of $S^{Snum}$ for the first array of sample data rates is discarded for representing the second array of the sample data rates.

21. The apparatus of claim 13, wherein each sample data rate is measured in units of 100 kilobits per second (kb/s).

22. The method of claim 13, wherein the average data rate of the first array of sample data rates is determined as:

$$R_{avg} = \text{Floor}\left(\sum_{i=0}^{i=N+1} \frac{R[i]}{N+2}\right)$$

where $R_{avg}$ is the average data rate of the first array of sample data rates, Floor( ) is a floor function, N is a number of sample data rates in the first array, and R[i] indicates a sample data rate at sample location i in the first array.

* * * * *

UNITED STATES PATENT AND TRADEMARK OFFICE
CERTIFICATE OF CORRECTION

| | |
|---|---|
| PATENT NO. | : 10,333,825 B2 |
| APPLICATION NO. | : 16/009643 |
| DATED | : June 25, 2019 |
| INVENTOR(S) | : Donald E. Eastlake, III |

It is certified that error appears in the above-identified patent and that said Letters Patent is hereby corrected as shown below:

In the Claims

In Column 12, in Claim 22, Line 18, delete "method" and insert -- apparatus --, therefor.

Signed and Sealed this
Twentieth Day of December, 2022

Katherine Kelly Vidal
*Director of the United States Patent and Trademark Office*